US008335255B2

(12) United States Patent
Lee et al.

(10) Patent No.: US 8,335,255 B2
(45) Date of Patent: Dec. 18, 2012

(54) MOTION ESTIMATION METHOD, MEDIUM, AND SYSTEM WITH FAST MOTION ESTIMATION

(75) Inventors: Ho-Jin Lee, Seoul (KR); Sang-Jo Lee, Suwon-si (KR); Si-hwa Lee, Seoul (KR); Do-hyung Kim, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1433 days.

(21) Appl. No.: 11/783,599

(22) Filed: Apr. 10, 2007

(65) Prior Publication Data

US 2007/0297512 A1     Dec. 27, 2007

(30) Foreign Application Priority Data

Jun. 21, 2006    (KR) .................. 10-2006-0056071

(51) Int. Cl.
*H04N 7/12*       (2006.01)

(52) U.S. Cl. ......... 375/240.16; 375/240.12; 375/240.01; 375/249; 348/699; 704/500; 704/501

(58) Field of Classification Search ............ 375/240.01, 375/240.12, 240, 16, 240.15, 240.13
See application file for complete search history.

(56) References Cited

U.S. PATENT DOCUMENTS

| | | | | |
|---|---|---|---|---|
| 5,428,403 A * | 6/1995 | Andrew et al. | ............... | 348/699 |
| 5,786,860 A | 7/1998 | Kim et al. | | |
| 6,205,176 B1 * | 3/2001 | Sugiyama | ............... | 375/240.12 |
| 6,516,033 B2 * | 2/2003 | Nakaya et al. | ........... | 375/240.17 |
| 6,671,319 B1 * | 12/2003 | Chang et al. | ............. | 375/240.16 |
| 6,845,130 B1 * | 1/2005 | Han et al. | ................. | 375/240.16 |
| 6,876,702 B1 * | 4/2005 | Hui et al. | ................. | 375/240.16 |
| 6,891,891 B2 * | 5/2005 | Pau et al. | ................. | 375/240.16 |
| 6,895,361 B2 * | 5/2005 | Yang | ............................. | 702/179 |
| 7,027,510 B2 * | 4/2006 | Auyeung | ................. | 375/240.16 |
| 7,336,707 B2 * | 2/2008 | Kim | ............................. | 375/240 |
| 7,519,117 B2 * | 4/2009 | Nakaya et al. | ........... | 375/240.16 |
| 7,567,617 B2 * | 7/2009 | Holcomb | ................. | 375/240.13 |
| 7,580,456 B2 * | 8/2009 | Li et al. | ......................... | 375/240 |
| 7,599,438 B2 * | 10/2009 | Holcomb et al. | ........ | 375/240.23 |
| 7,623,574 B2 * | 11/2009 | Holcomb | ................. | 375/240.16 |
| 7,693,219 B2 * | 4/2010 | Yan | ............................ | 375/240.16 |
| 7,751,482 B1 * | 7/2010 | Srinivasan et al. | ........ | 375/240.16 |
| 7,769,087 B2 * | 8/2010 | Wang et al. | ............. | 375/240.16 |
| 7,782,951 B2 * | 8/2010 | Muthukrishnan et al. | ........................ | 375/240.16 |

(Continued)

FOREIGN PATENT DOCUMENTS

EP       0 535 746 A2     4/1993

(Continued)

OTHER PUBLICATIONS

European Search Report issued Nov. 8, 2007 in corresponding European Patent Application No. 07105701.2-1522.

*Primary Examiner* — Syed A. Zia
(74) *Attorney, Agent, or Firm* — Staas & Halsey LLP

(57) ABSTRACT

A motion estimation method, medium, and system with fast motion estimation. The motion estimation method includes comparing a cost indicating a difference between a current block of a current image and a block of a reference image specified by a starting point with a predetermined threshold and selectively searching for the best matching block of the current block from the starting point according to the comparison result.

17 Claims, 12 Drawing Sheets

U.S. PATENT DOCUMENTS

| | | | |
|---|---|---|---|
| 7,852,936 B2 * | 12/2010 | Mukerjee et al. | 375/240.15 |
| 7,936,950 B2 * | 5/2011 | Ohwaki et al. | 382/300 |
| 8,000,392 B1 * | 8/2011 | Krupiczka et al. | 375/240.16 |
| 8,054,380 B2 * | 11/2011 | Bruna et al. | 348/448 |
| 8,064,520 B2 * | 11/2011 | Mukerjee et al. | 375/240.15 |
| 8,081,681 B2 * | 12/2011 | Guo et al. | 375/240.17 |
| 8,085,847 B2 * | 12/2011 | Lee et al. | 375/240.16 |
| 8,094,714 B2 * | 1/2012 | Nakazato et al. | 375/240.01 |
| 8,144,766 B2 * | 3/2012 | Nakazato | 375/240.01 |
| 8,160,148 B2 * | 4/2012 | Booth et al. | 375/240.16 |
| 8,184,709 B2 * | 5/2012 | Kuo et al. | 375/240.16 |
| 8,208,065 B2 * | 6/2012 | Sharlet et al. | 348/441 |
| 2006/0002632 A1 * | 1/2006 | Fu et al. | 382/294 |

FOREIGN PATENT DOCUMENTS

| | | |
|---|---|---|
| EP | 1 294 194 A1 | 3/2003 |
| EP | 1 339 223 A2 | 8/2003 |

* cited by examiner

| VIDEO | CONVENTIONAL | | WITH EARLY DECISION MECHANISM | | FULL-SEARCH | | DEGREE OF IMPROVEMENT (dB) |
|---|---|---|---|---|---|---|---|
| | SEARCH POINT | PSNR | SEARCH POINT | PSNR | SEARCH POINT | PSNR | |
| STEFAN | 10.73 | 24.05 | 12.00 (Δ1.27) | 26.38 | 1089 | 26.38 | +2.33 |
| FOREMAN | 8.47 | 32.24 | 8.87 (Δ0.4) | 33.56 | 1089 | 33.56 | +1.32 |

MOTION ESTIMATION METHOD, MEDIUM, AND SYSTEM WITH FAST MOTION ESTIMATION

CROSS-REFERENCE TO RELATED APPLICATIONS

This application claims the benefit of Korean Patent Application No. 10-2006-0056071, filed on Jun. 21, 2006, in the Korean Intellectual Property Office, the disclosure of which is incorporated herein in its entirety by reference.

BACKGROUND OF THE INVENTION

1. Field of the Invention

One or more embodiments of the present invention relate to a method, medium, and system for video encoding, and more particularly, to a method, medium, and system for video encoding with a motion estimation method, medium, and system with fast motion estimation.

2. Description of the Related Art

In order to achieve compression of video data, temporal redundancy between adjacent images in a corresponding video sequence can be removed. To remove such temporal redundancy, correlation between the adjacent images should be determined and block-matching motion estimation applied.

Here, since motion estimation between a current image and a reference image is the most intensive computational part of video encoding, efficient motion estimation has emerged as one of the more important tasks in video encoding. Accordingly, various block-based motion estimation techniques have been developed.

First, in a full search technique, costs of all blocks in a search range of a reference image are calculated and the block having the minimum cost is searched for. However, such a process requires a large number of computations, which prevents video encoding from being performed in real time. To solve this problem, fast block-matching motion estimation techniques, such as a pattern-based global search and a pattern-based local search, have been suggested. Examples of pattern-based global searches include a three-step search, a new three-step search, and a four-step search. Examples of pattern-based local searches include a diamond search and a hexagon search. In the pattern-based local search, unlike in the pattern-based global search, a search is made in only a part of a search range and thus a search for a local minimum can be performed quickly. In the following description, the three-step search and the diamond search will be used as examples of the pattern-based global search and the pattern-based local search, respectively.

FIG. 1 illustrates such a conventional three-step search through three illustrations.

Here, the sample image 11 of FIG. 1 shows a conventional three-step search algorithm. In a first step, costs of blocks specified by 9 points forming the largest area around a central point of a search range of a reference picture are calculated. In a second step, costs of blocks specified by 9 points forming the middle area around a point having the minimum cost among the costs calculated in the first step are calculated. In a third step, costs of blocks specified by 9 points forming the smallest area around a point having the minimum cost among the costs calculated in the second step are calculated. A block specified by a point having the minimum cost among the costs calculated in the third step is determined to be the best matching block of the current block.

The sample image 12 of FIG. 1 shows a distribution map of the calculated costs according to the three-step search algorithm. In particular, in the sample image 12, as the cost of a block decreases, the illustration of the block is darkened. The sample graph 13 of FIG. 1 shows the relationship between search range and cost. It can be seen from the sample graph 13 that the sample picture 12 has one global minimum.

Similarly, FIG. 2 illustrates such a conventional diamond search through three illustrations.

The sample image 21 of FIG. 2 shows a conventional diamond search algorithm. In a first step, costs of blocks specified by 9 points forming a diamond pattern around a central point of a search range of a reference picture are calculated. If the central point has the minimum cost among the costs calculated in the first step, a second step is skipped and a third step is performed. Otherwise, the second step is performed. In the second step, costs of blocks specified by 9 points forming the diamond pattern around a point having the minimum cost among the costs calculated in the first step are calculated. If the central point is the point having the minimum cost among the costs calculated in the second step, the third step is performed. Otherwise, the second step is repeated until the respective central point is the point having the minimum cost. In the third step, costs of blocks specified by 5 points forming the diamond pattern around the point having the minimum cost among the costs calculated in the second step are calculated. The block specified by a point having the minimum cost among the costs calculated in the third step is determined to be the best matching block of the current block.

The sample image 22 of FIG. 2 shows a distribution map of the calculated costs according to this conventional diamond search algorithm. In particular, in the sample image 22, as the cost of a block decreases, the illustration of the block is darkened. The sample graph 23 of FIG. 2 shows the relationship between search range and cost. Here, it can be seen from the sample graph 23 that the sample image 22 has three local minima.

In video having small and smooth motion changes, a block matching cost generally has one global minimum or local minimum, i.e., a uni-modality feature. On the other hand, in video having large motion changes, a block matching cost has a plurality of local minima, i.e., a multi-modality feature.

In the three-step search algorithm illustrated in FIG. 1, since one global minimum is searched for in the entire search range, it is not difficult to search for a true minimum in the search range of a video having large motion changes. However, in the diamond search algorithm illustrated in FIG. 2, since one local minimum is searched for in a portion of the search range, a point in the search range, which is not a true matching point, may be selected as a local minimum unless a starting point is selected as being sufficiently close to a global minimum in a video having large motion changes, i.e., a video whose block matching cost has the multi-modality feature. For example, if a starting point I(A) is selected, the diamond search algorithm is trapped with an inappropriate local minimum A. If a starting point I(B) is selected, the diamond search algorithm is trapped with an inappropriate local minimum B.

SUMMARY OF THE INVENTION

One or more embodiments of the present invention provide a motion estimation method, medium, and system with fast motion estimation, in which a local minimum that is a true minimum can be searched for within a search range for a video having a large motion change, i.e., a video whose block matching cost has a multi-modality feature.

Additional aspects and/or advantages of the invention will be set forth in part in the description which follows and, in part, will be apparent from the description, or may be learned by practice of the invention.

To achieve the above and/or other aspects and advantages, embodiments of the present invention include a motion estimation method, including comparing a predetermined threshold with a cost indicating a difference between a current block of a current image and a block of a reference image specified by a select starting point, wherein the select starting point is changed based upon the comparison of the predetermined threshold and the cost, and selectively searching for a matching block of the current block from the select starting point or the changed select starting point.

To achieve the above and/or other aspects and advantages, embodiments of the present invention include at least one medium including computer readable code to control at least one processing element to implement a motion estimation method, the motion estimation method including comparing a predetermined threshold with a cost indicating a difference between a current block of a current image and a block of a reference image specified by a select starting point, wherein the select starting point is changed based upon the comparison of the predetermined threshold and the cost, and selectively searching for a matching block of the current block from the select starting point or the changed select starting point.

To achieve the above and/or other aspects and advantages, embodiments of the present invention include a motion estimation system, including a comparison unit to compare a predetermined threshold with a cost indicating a difference between a current block of a current image and a block of a reference image specified by a select starting point, wherein the select starting point is changed based upon the comparison of the predetermined threshold and the cost, and a search unit to selectively search for a matching block of the current block from the select starting point or the changed select starting point.

To achieve the above and/or other aspects and advantages, embodiments of the present invention include a video encoding method, including calculating a motion vector using a threshold that is a criterion for determining a suitable start point for searching in a reference image for a matching block of a current block of a current image, generating a prediction image of the current image from the reference image using the calculated motion vector, calculating a difference between the generated prediction image and the current image to generate a difference between the current image and the generated prediction image, and encoding and outputting the calculated difference between the current image and the generated prediction image.

To achieve the above and/or other aspects and advantages, embodiments of the present invention include at least one medium including computer readable code to control at least one processing element to implement a video encoding method, the video encoding method including calculating a motion vector using a threshold that is a criterion for determining a suitable start point for searching in a reference image for a matching block of a current block of a current image, generating a prediction image of the current image from the reference image using the calculated motion vector, calculating a difference between the generated prediction image and the current image to generate a difference between the current image and the generated prediction image, and encoding and outputting the calculated difference between the current image and the generated prediction image.

To achieve the above and/or other aspects and advantages, embodiments of the present invention include a video encoder, including a motion estimation unit to calculate a motion vector using a threshold that is a criterion for determining a suitable start point for searching in a reference image for a matching block of a current block of a current image, a motion compensation unit to generate a prediction image of the current image from the reference image using the calculated motion vector, a subtraction unit to calculate a difference between the generated prediction image and the current image to generate a difference between the current image and the generated prediction image, and an encoding unit to encode and output the calculated difference between the current image and the generated prediction image.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
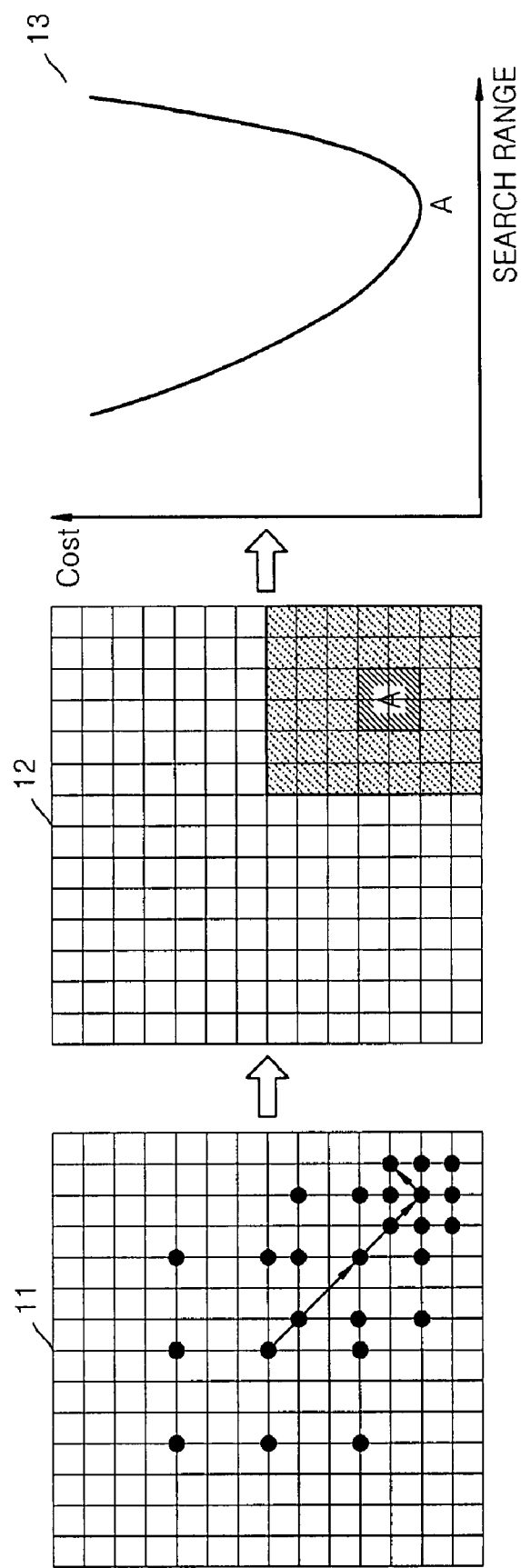
FIG. 1 illustrates a conventional three-step search through three illustrations.
Figure 2:
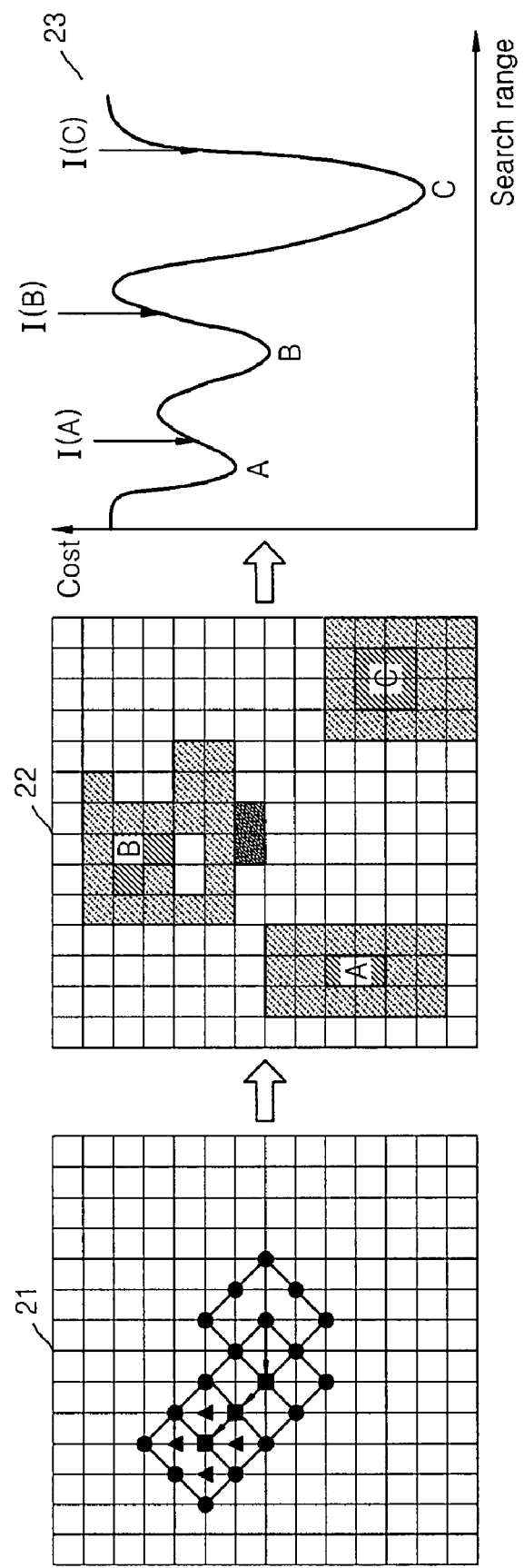
FIG. 2 illustrates a conventional diamond search through three illustrations.

Reference will now be made in detail to embodiments of the present invention, examples of which are illustrated in the accompanying drawings, wherein like reference numerals refer to the like elements throughout. Embodiments are described below to explain the present invention by referring to the figures.

In order to solve the aforementioned conventional problem in searching for a local minimum to identify a matching point to an original point during motion estimation, a true minimum may not be actually selected, but another point may be selected as the local minimum in a search range unless the starting point is selected as being close to a global point for a video whose block matching cost has a multi-modality feature. More precisely, to prevent inappropriate starting point selection, a starting point selection mechanism according to an embodiment of the present invention introduces a threshold Th(L) as a criterion for selecting a starting point that is suitable for searching in a reference image for the best matching block of the current block.

Figure 3:
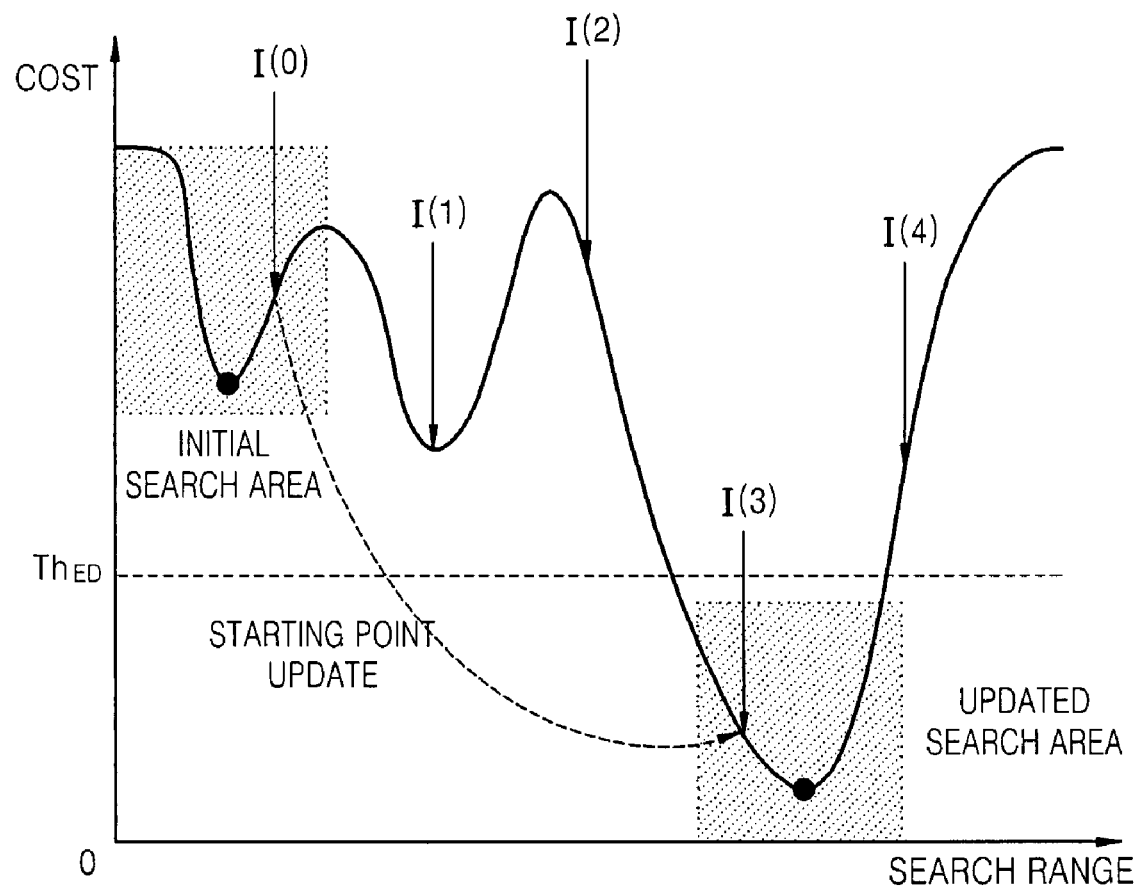
FIG. 3 illustrates operation of a starting point selection mechanism, according to an embodiment of the present invention.

Referring to FIG. 3, if an initial starting point I(0) is selected, a local search algorithm performs a search toward points having smaller costs than the initial starting point I(0) and thus is trapped with an inappropriate local minimum. In the start point selection mechanism, according to an embodiment of the present invention, such an inappropriate local minimum is avoided by changing the starting point from the initial starting point I(0) to a new starting point I(3) having a smaller cost than the threshold Th(L).

Figure 4:
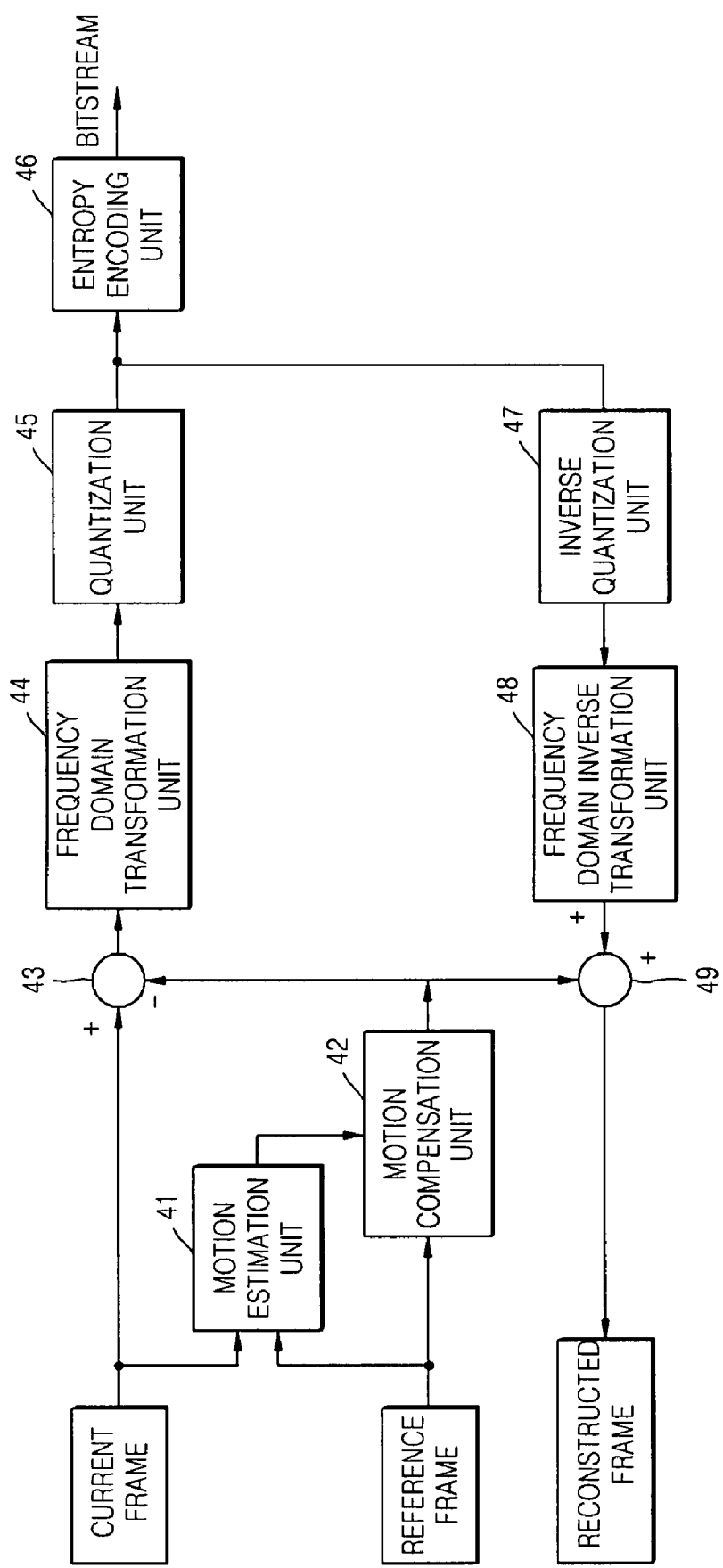
FIG. 4 illustrates a video encoder, according to an embodiment of the present invention.

FIG. 4 illustrates a video encoder, according to an embodiment of the present invention.

Referring to FIG. 4, the video encoder may include a motion estimation unit 41, a motion compensation unit 42, a subtraction unit 43, a frequency domain transformation unit 44, a quantization unit 45, an entropy encoding unit 46, an inverse quantization unit 47, a frequency domain inverse transformation unit 48, and an addition unit 49, for example.

The motion estimation unit 41 calculates, for each block of the current image, a motion vector corresponding to a displacement between the current block in the current image and a block corresponding to the current block in a reference image through use of a threshold that is a criterion for selecting a starting point suitable for searching in the reference image for the best matching block of the current block. More specifically, the motion estimation unit 41 may compare a cost, which indicates a difference between the current block of the current image and a block of the reference image specified by a starting point, with the threshold and then search for the best matching block of the current block of the current image selectively from the starting point according to the comparison result, thereby calculating a motion vector.

The motion compensation unit 42 generates a prediction image for the current image from the reference image using the motion vector calculated by the motion estimation unit 41 for blocks of the current image.

The subtraction unit 43 subtracts the prediction image generated by the motion compensation unit 42 from the current image, thereby generating a difference between the current image and the prediction image.

The frequency domain transformation unit 44 may further transform the difference generated by the subtraction unit 43 from a color domain to a frequency domain. Such transformation from the color domain to the frequency domain may be discrete hadamard transformation (DHT) or discrete cosine transformation (DCT)-based integer transformation, for example.

The quantization unit 45 may then quantize values transformed by the frequency domain transformation unit 44. In other words, the quantization unit 45 may divide frequency component values transformed by the frequency domain transformation unit 44 by a quantization parameter and approximate the results to integer values.

The entropy encoding unit 46 may generate a bitstream by performing entropy encoding on values quantized by the quantization unit 45 and output the resultant bitstream. Here, as an example, the entropy encoding may be context-adaptive variable length coding (CAVLC) or context-adaptive binary arithmetic coding (CABAC).

The inverse quantization unit 47 may inversely quantize values quantized by the quantization unit 45. In other words, the inverse quantization unit 47 may reconstruct the frequency component values by multiplying the integer values approximated by the quantization unit 45 by using the quantization parameter.

The frequency domain inverse transformation unit 48 may transform the frequency component values reconstructed by the inverse quantization unit 47 from a frequency domain to a color domain, for the reconstructing of the difference between the current image and the prediction image.

Thereafter, addition unit 49 may add the difference reconstructed by the frequency domain inverse transformation unit 48, for example, to the prediction image generated by the motion compensation unit 42, thereby generating a reconstructed image.

Figure 5:
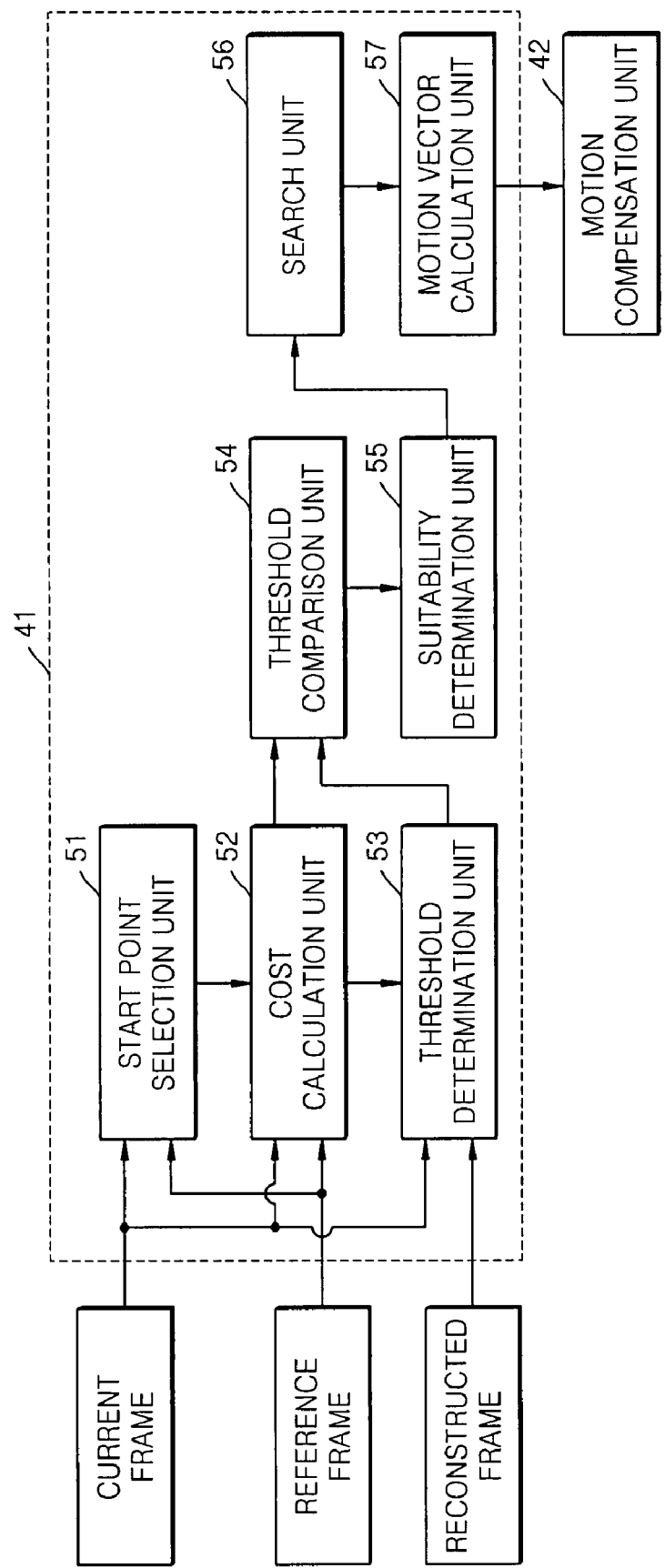
FIG. 5 illustrates a motion estimation unit, such as that illustrated in FIG. 4, according to an embodiment of the present invention.

FIG. 5 illustrates a motion estimation unit 41, such as that of FIG. 4, according to an embodiment of the present invention.

Referring to FIG. 5, the motion estimation unit 41 may include a start point selection unit 51, a cost calculation unit 52, a threshold determination unit 53, a threshold comparison unit 54, a suitability determination unit 55, a search unit 56, and a motion vector calculation unit 57, for example.

The start point selection unit 51 may select an initial starting point I(0) for searching in a search range of a reference image for an N×M block that best matches a current N×M block of the current image. In one embodiment, an N×M block may be any one of a 16×16 block, an 8×8 block, and a 4×4 block. In particular, the 16×16 block is called a macroblock. For example, the start point selection unit 51 may select an initial starting point based on a previous result about blocks of the reference image which best match neighboring blocks of the current block of the current image.

In addition, if Cost (0) calculated by the cost calculation unit 52 is higher than the threshold Th(L), e.g., as determined by the threshold determination unit 53, as a result of a comparison performed by the threshold comparison unit 54, the start point selection unit 51 may select in the search range of the reference image to include at least one additional starting points I(1) to I(N) for searching for the best matching block of the current block, in addition to the initial starting point I(0). Here, N is a natural number greater than 1.

The cost calculation unit 52 calculates Cost (0) indicating a difference between the current block and a block of the reference image, specified by the initial starting point I(0), e.g., as selected by the start point selection unit 51. Here, the block of the reference image specified by the initial starting point I(0) may be a block whose starting point is a top-left, top-right, or central point, for example.

The cost calculation unit 52 may calculate Cost(1) to Cost (N) indicating differences between the current block and blocks of the reference image specified by the additional starting points I(1) to I(N) selected by the start point selection unit 51. A sum of absolute differences (SAD) may be taken as a representative example of a cost. In other words, the cost calculation unit 52 may calculate an SAD indicating a difference between a current block A and a block B of the reference image specified by a starting point selected by the start point selection unit 51, using the below Equation 1, for example. Here, in Equation 1, N×M indicates the size of the current block A and the block B and Vx and Vy indicate a displacement of the block B with respect to the current block A.

Equation 1:

$$SAD(V_x, V_y) = \sum_{n,m=0}^{n-1} |F(N, M) - G(N + V_x, M + V_y)|$$

Thus, the threshold determination unit 53 may determine the threshold Th(L), which is a criterion for selecting a starting point suitable for searching for a block of a reference image, that best matches the current block. In particular, in one embodiment, the threshold determination unit 53 determines the threshold Th(L) in the following two ways. In the first way, the threshold determination unit 53 may determine the threshold Th(L) using a test sequence including a plurality of images.

More specifically, in this first way, the threshold determination unit 53 may generate reconstructed images of the original images making up a test sequence using a random threshold and calculate a peak signal to noise ratio (PSNR) between the original images making up the test sequence and the reconstructed images. In other words, the threshold determination unit 53 may calculate the PSNR using the below Equation 2, for example. Here, n indicates the number of bits of the images making up the test sequence and a mean squared error (MSE) indicates the mean squared error between the original images and the reconstructed images.

Equation 2:

$$PSNR_{dB} = 10 \log_{10} \frac{(2^n - 1)^2}{MSE}$$

Next, the threshold determination unit 53 may compare the calculated PSNR with a PSNR(L) that is a standard for video display quality. If the PSNR is greater than the PSNR(L), the threshold determination unit 53 may increase a threshold Th by a predetermined value and repeat the above process. Unless the PSNR is greater than the PSNR(L), the threshold determination unit 53 may thus determine the threshold Th to be the threshold Th(L) as a criterion for selecting the starting point suitable for searching for the block of a reference image that best matches the current block. Threshold determination will be described in more detail with reference to FIGS. 7 and 8.

In the second way that the threshold determination unit 53 may determine the threshold Th(L), the threshold determination unit 53 may use a cost indicating a difference between a neighboring block of the current block and a block of the reference image corresponding to the neighboring block. The neighboring block of the current block may be a block located above, above and to the right side of, or above and to the left side of the current block, for example. The threshold determination unit 53 may determine the threshold Th(L) in various ways according to differing applications as follows.

The threshold determination unit 53 may identify, as the threshold Th(L), the maximum value from among Cost(U) indicating a difference between a block located above the current block and a block of a reference image corresponding to the block located above the current block, Cost(R) indicating a difference between a block located above and to the right side of the current block and a block of the reference image corresponding to the block located above and to the right side of the current block, and Cost(L) indicating a difference between a block located to the left side of the current block and a block of the reference image corresponding to the block located to the left side of the current block, for example.

The threshold determination unit 53 may also identify, as the threshold Th(L), the average value of Cost(U) indicating a difference between a block located above the current block and a block of a reference image corresponding to the block located above the current block, Cost(R) indicating a difference between a block located above and to the right side of the current block and a block of the reference image corresponding to the block located above and to the right side of the current block, and Cost(L) indicating a difference between a block located to the left side of the current block and a block of the reference image corresponding to the block located to the left side of the current block, for example.

The threshold determination unit 53 may also identify, as the threshold Th(L), the minimum value from among Cost(U) indicating a difference between a block located above the current block and a block of a reference image corresponding to the block located above the current block, Cost(R) indicating a difference between a block located above and to the right side of the current block and a block of the reference image corresponding to the block located above and to the right side of the current block, and Cost(L) indicating a difference between a block located to the left side of the current block and a block of the reference image corresponding to the block located to the left side of the current block, for example.

The threshold comparison unit 54 may compare Cost(0), e.g., as calculated by the cost calculation unit 52, with the threshold Th(L), e.g., as determined by the threshold determination unit 53. The threshold comparison unit 54, thus, may compare the minimum value Cost(min), from among Cost(1) to Cost(N) calculated by the cost calculation unit 52 with Cost(0) calculated by the cost calculation unit 52.

If Cost(0) calculated by the cost calculation unit 52 is less than the threshold Th(L), the suitability determination unit 55 may determine that the initial starting point I(0) selected by the starting point selection unit 51 is suitable for searching in a reference image for the best matching block of the current block.

If the minimum value Cost(min) among Cost(1) to Cost(N) is less than the calculated Cost(0), the suitability determination unit 55 may determine that the additional starting point I(M) having Cost(min) is suitable for searching in a reference image for the best matching block of the current block.

The search unit 56 may, thus, search in a search range of the reference image for the best matching block of the current block according to a predetermined local search algorithm, starting with the starting point, e.g., as determined by the suitability determination unit 55, to be suitable for searching for the best matching block of the current block. If the predetermined local search algorithm is a diamond search algorithm, the search unit 56 searches in a search range of the reference image for the best matching block of the current block according to a diamond pattern prescribed in the aforementioned diamond search algorithm, starting with the starting point determined by the suitability determination unit 55 to be suitable for searching for the best matching block of the current block.

The motion vector calculation unit 57 may then calculate a motion vector corresponding to the displacement between the current block and the block found by the search unit 56.

Figure 6:
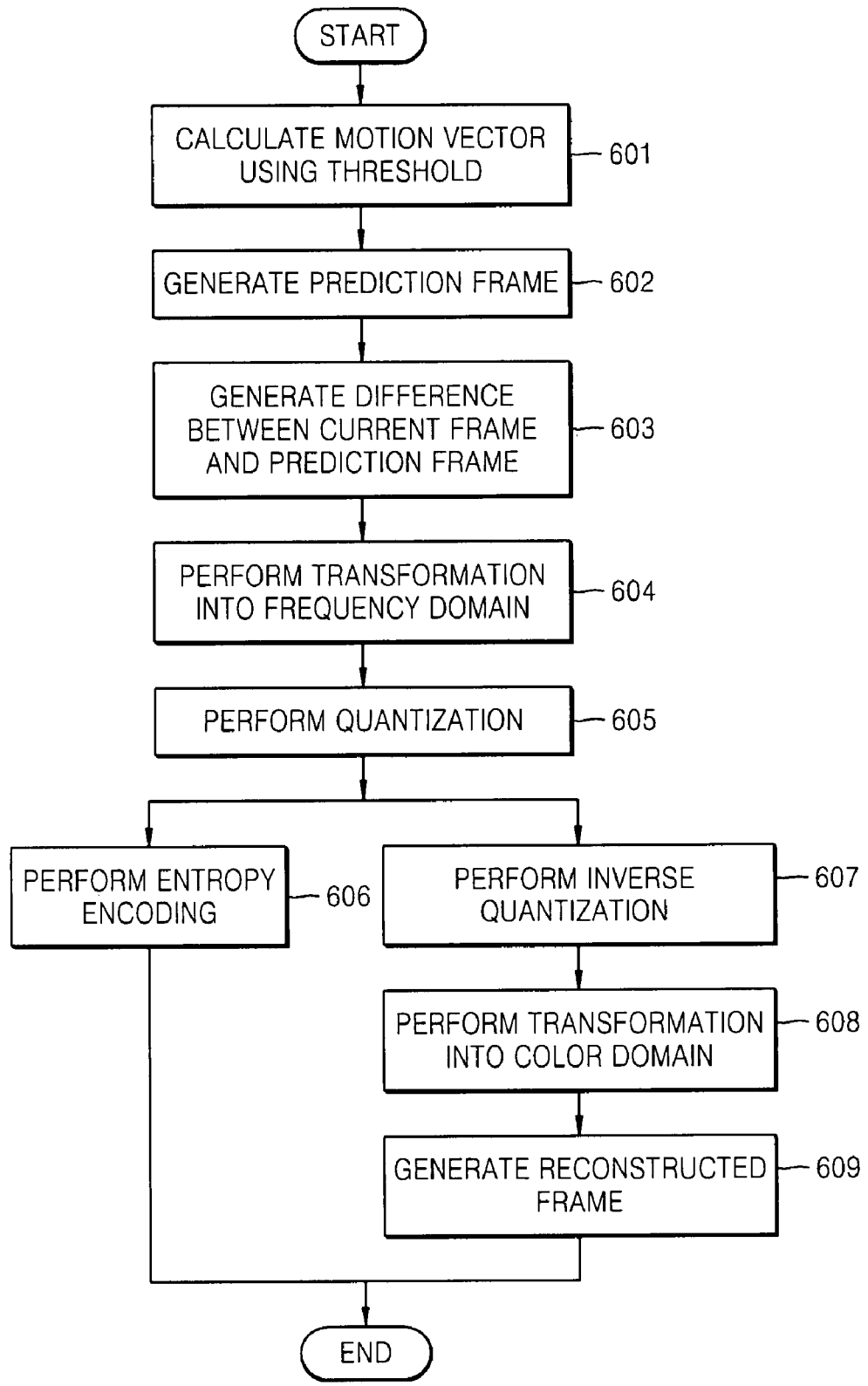
FIG. 6 illustrates a video encoding method, according to an embodiment of the present invention.

FIG. 6 illustrates a video encoding method, according to an embodiment of the present invention.

Referring to FIG. 6, the video encoding method includes operations that may be processed sequentially by a video encoder, for example, including the video encoder illustrated in FIG. 4, noting that alternative embodiments are equally available. Description above regarding the video encoder illustrated in FIG. 4 may, thus, also be applied to the video encoding method according to one embodiment of the present invention.

In operation 601, for each block of the current image, a motion vector corresponding to a displacement between the current block of the current image and a block of a reference image corresponding to the current block may be calculated using a threshold as a criterion for determining a suitable starting point for searching within the reference image for the best matching block of the current block.

In operation 602, a prediction image of the current image may be generated from the reference image, e.g., using the motion vector calculated for each block of the current image in operation 601.

In operation 603, the prediction image may be subtracted from the current image to generate a difference between the current image and the prediction image.

In operation 604, the generated difference may be transformed from a color domain to a frequency domain.

In operation 605, transformed values may then be quantized.

In operation 606, a bitstream may then be generated by performing entropy encoding on the quantized values and then output.

In operation 607, the quantized values may further be inverse quantized.

In operation 608, inverse quantized frequency component values, e.g., as reconstructed in operation 607, may be transformed from the frequency domain to the color domain, thereby reconstructing the difference between the current image and the prediction image.

In operation 609, the reconstructed difference may further be added to the prediction image, thereby generating a reconstructed image.

Figure 7:
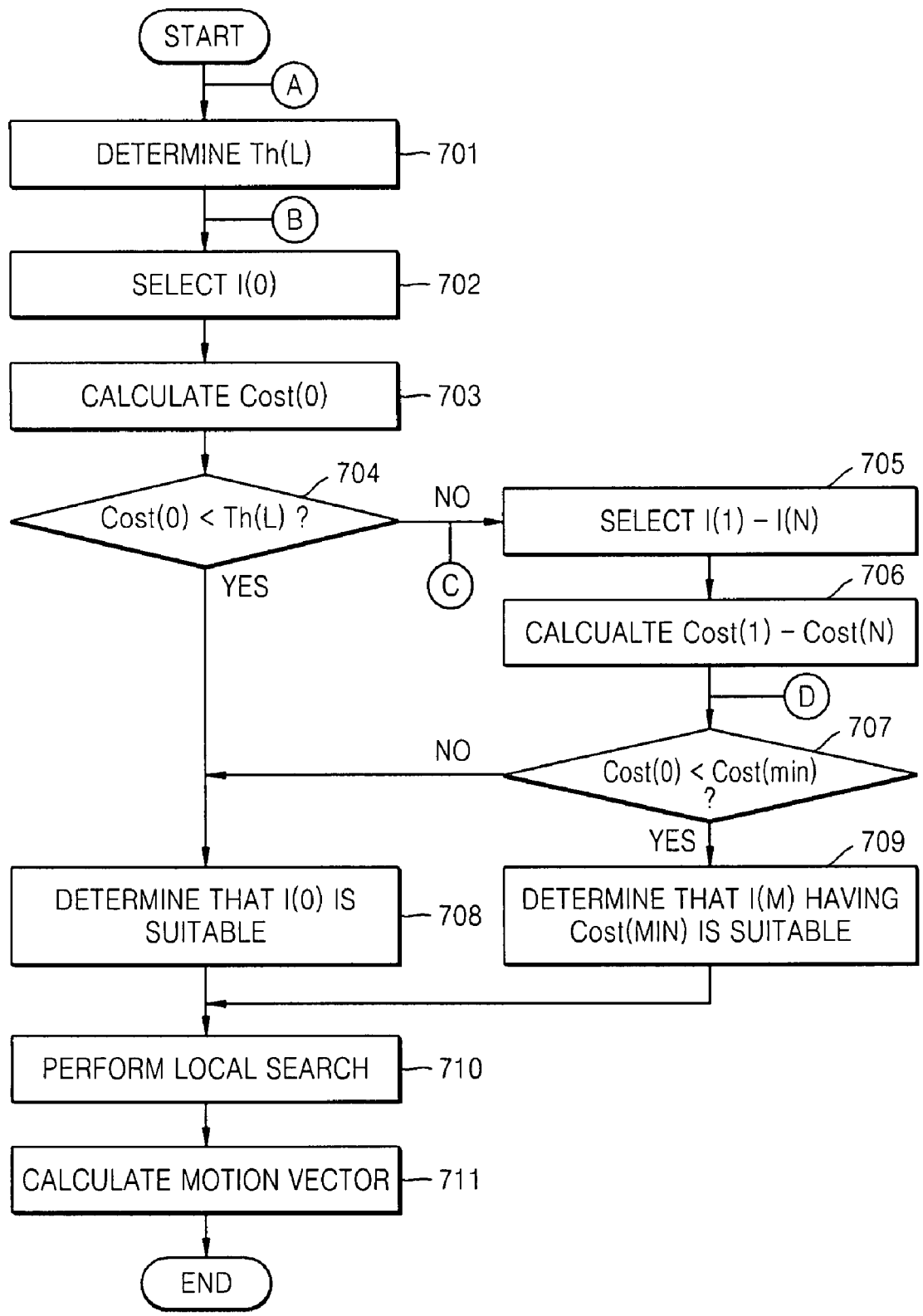
FIG. 7 illustrates a motion estimation method, according to an embodiment of the present invention.

FIG. 7 illustrates a motion estimation method, according to an embodiment of the present invention.

Referring to FIG. 7, the motion estimation method includes operations that may be processed sequentially, such as by the motion estimation unit 41 illustrated in FIG. 5, noting that alternative embodiments are equally available. Descriptions above made regarding the motion estimation unit 41 illustrated in FIG. 5 may, thus, also be applied to the motion estimation method according to one embodiment of the present invention.

In operation 701, a threshold Th is determined as a criterion for determining a starting point suitable for searching in the reference image for the best matching block of the current block.

In operation 702, the initial starting point I(0) may be selected for searching in the search range of the reference image for the best matching block of the current block.

In operation 703, a difference may be indicated between the current block and the block of the reference image specified by the selected initial starting point I(0).

In operation 704, the calculated Cost(0) may be compared with the determined threshold Th. For example, if Cost(0) is less than the determined threshold Th, operation 705 may be performed. Otherwise, operations may proceed directly to operation 708.

In operation 705, at least one additional starting point from I(1) to I(N) may be selected for searching in the search range of the reference image for the best matching block of the current block, in addition to the selected initial starting point I(0), for example.

In operation 706, Cost(1) to Cost(N) may be calculated, indicating differences between the current block and blocks of the reference image specified by the selected additional starting points I(1) to I(N).

In operation 707, the minimum value Cost(min) may then be compared from among the calculated Cost(1) to Cost(N) with the calculated Cost(0). If Cost(min) is greater than Cost(0), operation 708 may be performed. Otherwise, operations may proceed directly to operation 709.

In operation 708, the initial starting point I(0) may be determined as being selected as being suitable for searching for the best matching block of the current block.

In operation 709, the additional starting point I(M) may be determined to have the minimum value Cost(min) among the calculated Cost(1) to Cost(N) suitable for searching for the best matching block of the current block.

In operation 710, the reference image may be searched for the best matching block of the current block according to a predetermined local search algorithm, starting with the starting point, e.g., determined in operation 708 or 709, to be suitable for searching for the best matching block of the current block.

In operation 711, a motion vector corresponding to the displacement between the current block and the block found in operation 710 may further be calculated.

Figure 8:
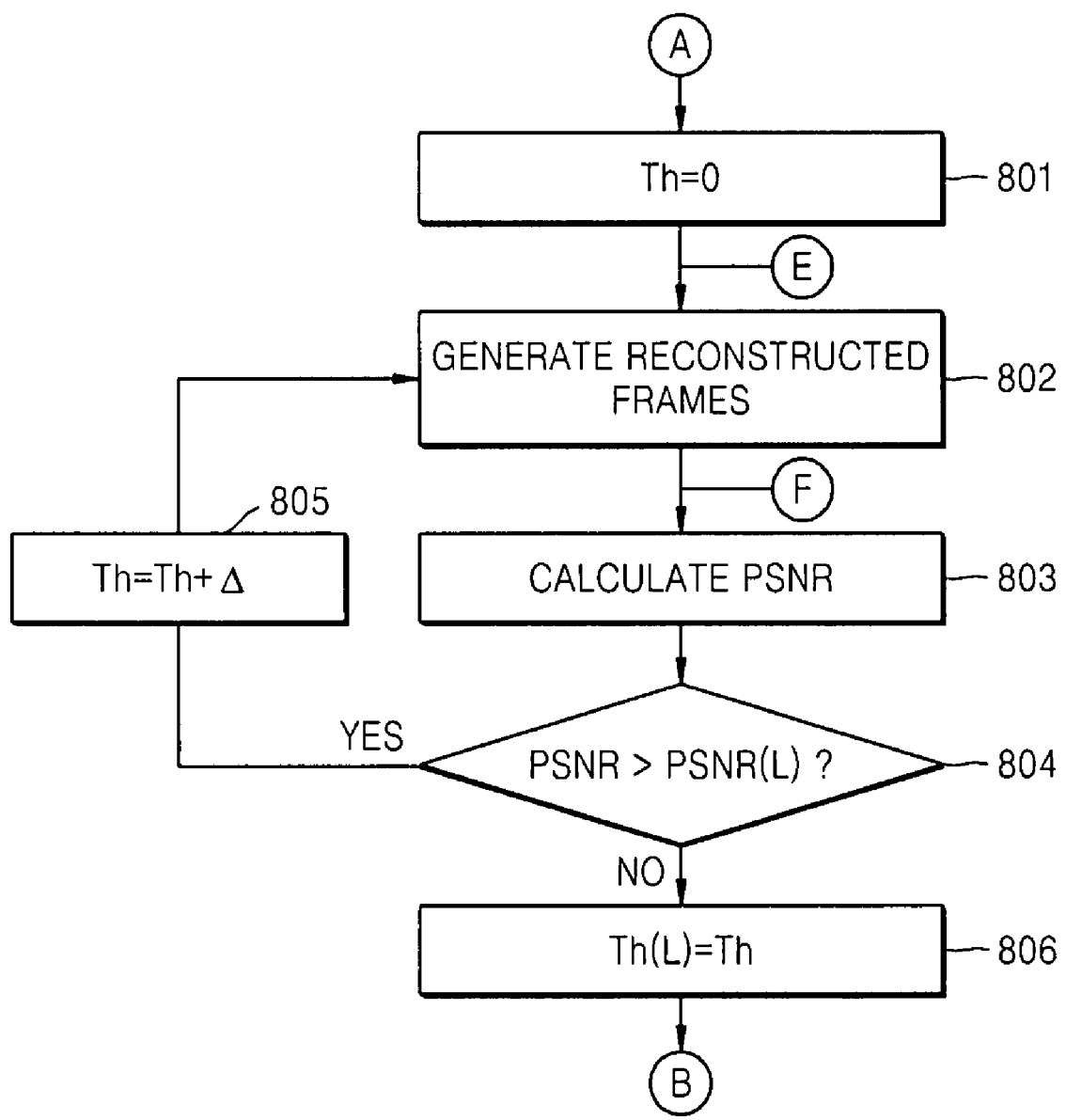
FIG. 8 illustrates an operation of determining a threshold Th in order to determine a suitable starting point, as illustrated in FIG. 7, according to an embodiment of the present invention.

FIG. 8 illustrates an operation, such as that of operation 701 of FIG. 7, according to an embodiment of the present invention.

Referring to FIG. 8, such an operation 701 may include the following operations, for example. In particular, the flowchart of FIG. 8 corresponds to the aforementioned first way of determining the threshold.

In operation 801, the threshold Th may be determined to be 0.

In operation 802, reconstructed images of the original images making up a test sequence may be generated using the determined threshold Th.

In operation 803, a PSNR between the original images and the reconstructed images may further be calculated.

In operation 804, the calculated PSNR may be compared with a PSNR(L) of a standard PSNR for video display quality. If the calculated PSNR is greater than the PSNR(L), the operations may proceed to operation 805. Otherwise, operations my proceed directly to operation 707.

In operation 805, the determined threshold Th may be increased by a predetermined value and operation 802 may again be performed.

In operation 806, the determined threshold Th may be determined to be a threshold Th(L) as the criterion for selecting a starting point suitable for searching in the reference image for the best matching block of the current block.

Figure 9:
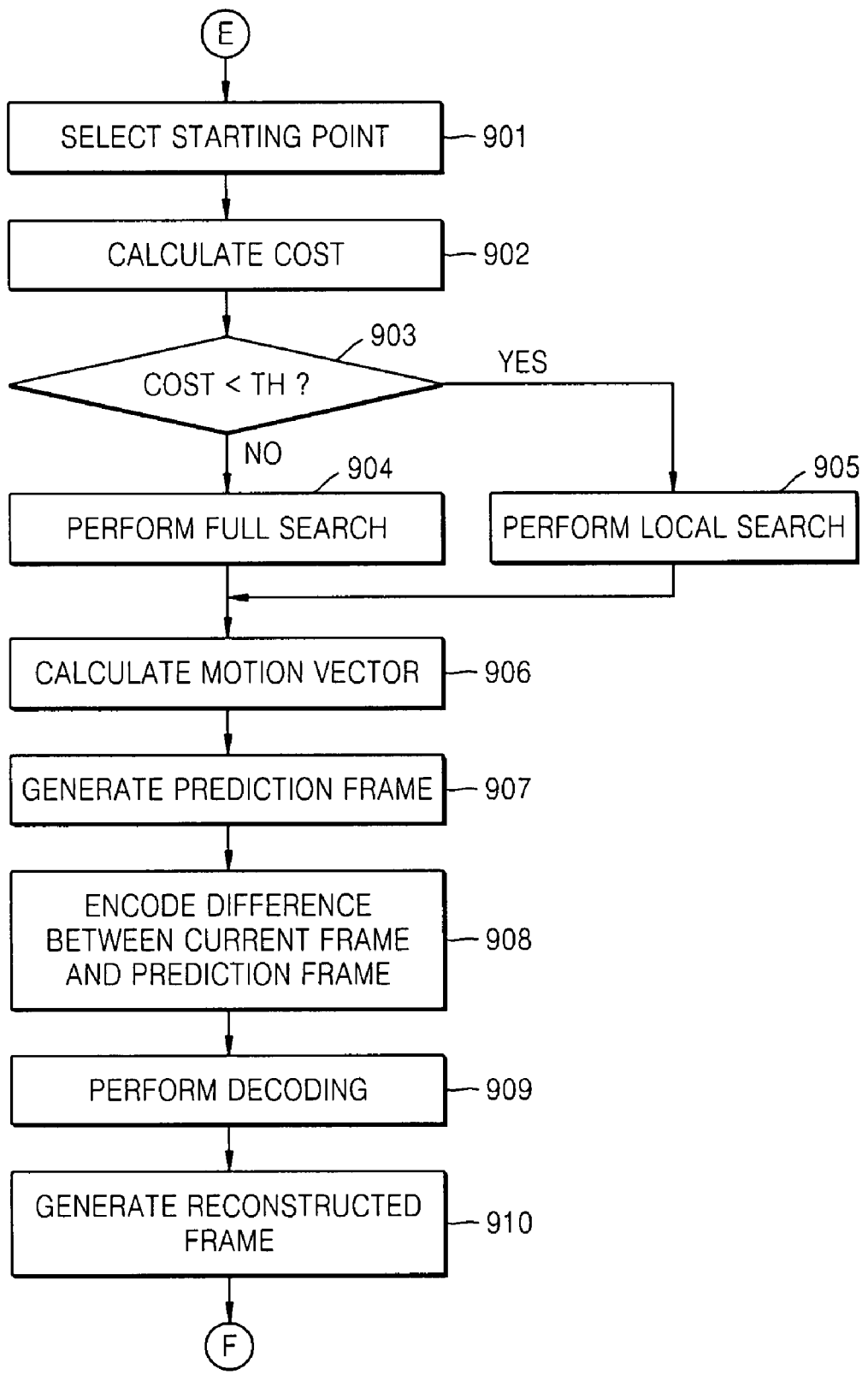
FIG. 9 illustrates an operation of generating reconstructed images as illustrated in FIG. 8, according to an embodiment of the present invention.

FIG. 9 illustrates an operation, such as operation 802 illustrated in FIG. 8, according to an embodiment of the present invention.

Referring to FIG. 9, example operation 802 illustrated in FIG. 8 may include the following operations. In particular, the flowchart of FIG. 9 indicates a processing order in a block level, e.g., in a macroblock level, while the abovementioned flowchart of FIG. 8 indicates a processing order in a sequence level composed of a plurality of images.

In operation 901, a starting point may be selected for searching in the search range of the reference image for the best matching block of the current block of the current image among the original images making up the test sequence for each block of the original image.

In operation 902, for each block of the original image, a cost may be calculated, the cost indicating a difference between the current block and a block of the reference image specified by the selected starting point.

In operation 903, for each block of the original image, the calculated cost may be compared with the determined threshold Th. If the calculated cost is greater than the determined threshold Th, operation 904 may be performed. Otherwise, operation may proceed directly to operation 905.

In operation 904, the full search range of the reference image may be searched for the best matching block of the current block according to a full search algorithm for each block of the original image.

In operation 905, the search range of the reference image may be searched for the best matching block of the current block according to a predetermined local search algorithm, starting with the selected starting point.

In operation 906, for each block of the original image, a motion vector corresponding to the displacement between the current block and the block found in operation 905 may be calculated.

In operation 907, the prediction image of the current image may be generated from the reference image using the motion vectors calculated in operation 906, for example.

In operation 908, a difference between the current image and the prediction image may be encoded. In general, in an embodiment, encoding in operation 908 means encoding performed by the frequency domain transformation unit 44 and the quantization unit 45 of FIG. 4, noting that alternative encoding processes are equally available.

In operation 909, the encoding result of operation 908 may be decoded. In general, in an embodiment, decoding in operation 909 means decoding performed by the inverse quantization unit 47 and the frequency domain inverse transformation unit 48 of FIG. 4, noting that alternative decoding processes are equally available.

In operation 910, the decoding result of operation 909 may be added to the generated prediction image, thereby generating a reconstructed image.

Figure 10:
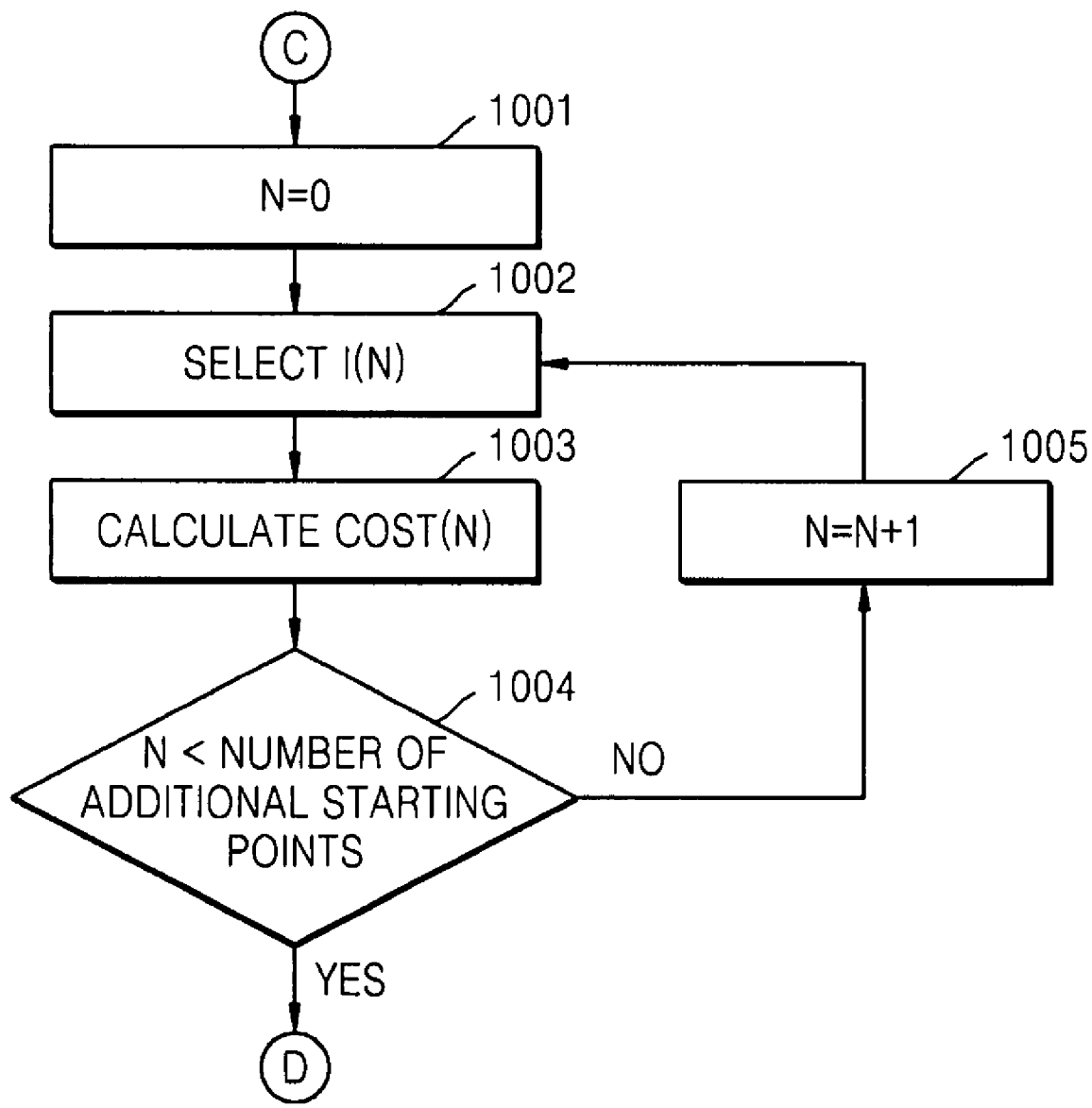
FIG. 10 illustrates operations, such as those illustrated in FIG. 7, where at least one additional starting point I(1) to I(N) is selected and Cost(1) to Cost(N), indicating differences between the current block and blocks of the reference image specified by the selected additional starting points I(1) to I(N), are calculated, according to an embodiment of the present invention.

FIG. 10 illustrates operations, such as operations 705 and 706 illustrated in FIG. 7, according to another embodiment of the present invention.

Referring to FIG. 10, in an embodiment, operations 705 and 706 illustrated in FIG. 7 may include the following operations. In particular, the flowchart illustrated in FIG. 10 shows a case where the cost calculation unit 52 calculates costs for all the additional starting points selected by the start point selection unit 51.

In operation 1001, N may be determined to be 0.

In operation 1002, the starting point I(N) may be selected for searching in the search range of the reference image for the best matching block of the current block.

In operation 1003, Cost(N) indicating a difference between the current block and a block of the reference image specified by the selected starting point I(N) may further be calculated.

In operation 1004, operation 1005 may be performed if N is less than the number of additional starting points. Otherwise, operations may proceed directly to operation 707.

In operation 1005, N may be increased by 1 and operation 1002 may again be performed.

Figure 11:
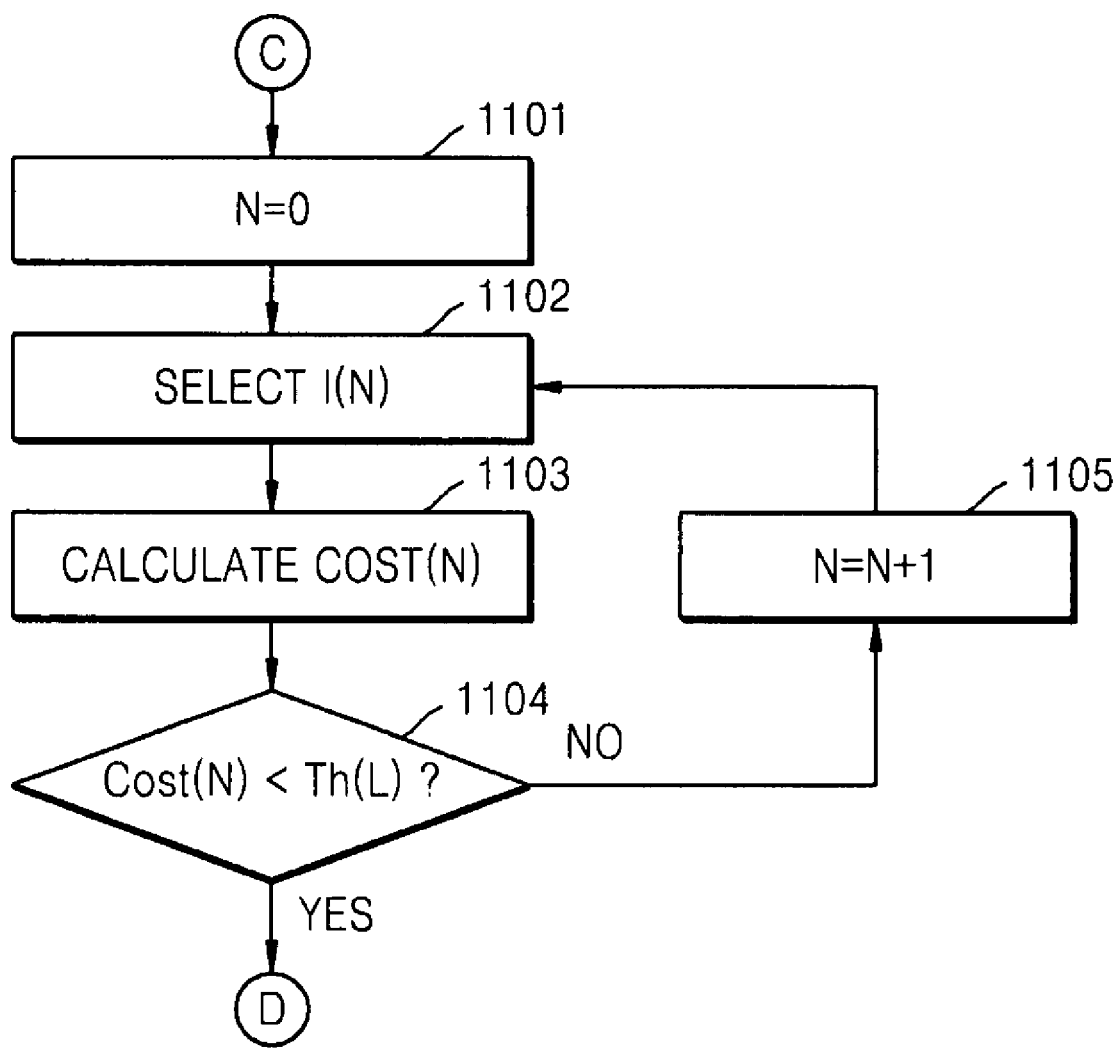
FIG. 11 illustrates operations, such as those detailed in FIG. 10, but for a case where a cost calculation unit terminates a cost calculation when its calculated cost is less than a threshold for the additional starting point selected by a starting point selection unit, according to an embodiment of the present invention.

FIG. 11 illustrates operations, such as operations 705 and 706 illustrated in FIG. 7, according to another embodiment of the present invention.

Referring to FIG. 11, in an embodiment, operations 705 and 706 illustrated in FIG. 7 may include the following operations. In particular, the flowchart illustrated in FIG. 11 shows a case where the cost calculation unit 52 terminates the cost calculation when its calculated cost is less than a threshold for the additional starting point selected by the start point selection unit 51.

In operation 1101, N may be determined to be 0.

In operation 1102, the starting point I(N) may be selected for searching in the search range of the reference image for the best matching block of the current block.

In operation 1103, Cost(N) indicating a difference between the current block and the block of the reference block specified by the selected starting point I(N) may be calculated.

In operation 1104, the calculated Cost(N) may be compared with the threshold Th(L). If the calculated Cost(N) is greater than the threshold Th(L), operation 1105 may be performed. Otherwise, operations may proceed directly to operation 707.

Figure 12:
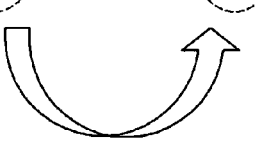
FIG. 12 illustrates example results of a comparison between a performances of a conventional motion estimation technique and a motion estimation method according to an embodiment of the present invention.

FIG. 12 illustrates results of a comparison between the performances of a conventional motion estimation technique and a motion estimation method according to an embodiment of the present invention.

Referring to FIG. 12, the conventional motion estimation technique exhibits a PSNR value of 24.05 with respect to a well known Stefan image and a PSNR value of 32.24 with respect to a well known foreman image. On the other hand, a motion estimation method according to an embodiment of the present invention was shown to exhibit a PSNR value of 26.38 with respect to the Stefan image and a PSNR value of 33.56 with respect to the foreman image. In other words, the corresponding motion estimation method has a display quality reproduction performance that is nearly equal to that of a full search algorithm. Such a performance is obtained by solving the aforementioned problem of an inappropriate local minimum for matching block searching being selected due to inappropriate selection of a starting point.

In addition to the above described embodiments, embodiments of the present invention can also be implemented through computer readable code/instructions in/on a non-transitory machine-accessible and readable medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as carrier waves, as well as through the Internet, for example. Thus, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

According to one or more embodiments of the present invention, when a cost indicating a difference between the current block and a block of a reference image specified by a starting point is less than a predetermined threshold, a local search can be performed from an appropriate starting point, thereby solving the aforementioned conventional problem of an inappropriate point corresponding to an inappropriate minimum being selected as a local minimum in a search range of the reference image. In other words, it is possible to search in a search range for a local minimum that is a true minimum for video having a large motion changes, i.e., video whose block matching costs have a multi-modality feature.

In addition, according to one or more embodiments of the present invention, a motion vector may be calculated using a threshold that is a criterion for determining a starting point suitable for searching in the reference image for the best matching block of the current block. Thus, video may be further compressed using the calculated motion vector, thereby maintaining the efficiency of the conventional local search algorithm while supporting display quality that is equivalent to that of a full-search algorithm.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A motion estimation method, comprising:
   comparing, by at least one processor, a predetermined threshold with a cost indicating a difference between a current block of a current image and a block of a reference image specified by a select starting point, wherein the select starting point is changed based upon the comparing of the predetermined threshold and the cost;
   selectively searching, by at least one processor, for a matching block of the current block using a predetermined local search algorithm from the changed select starting point, according to the comparing; and
   calculating, by at least one processor, a motion vector corresponding to a displacement between the current block and the matching block found by the searching.

2. The motion estimation method of claim 1, wherein the selectively searching comprises searching for the matching block of the current block from the select starting point if the cost is less than the predetermined threshold.

3. The motion estimation method of claim 1, wherein the comparing of the predetermined threshold with the cost further comprises changing the select starting point if the cost is not less than the predetermined threshold and comparing the predetermined threshold with a corresponding cost based upon the changed select starting point.

4. A motion estimation method, comprising:
   comparing, by at least one processor, a predetermined threshold with a cost indicating a difference between a current block of a current image and a block of a reference image specified by a select starting point, wherein the select starting point is changed based upon the comparing of the predetermined threshold and the cost;
   selectively searching, by at least one processor, for a matching block of the current block from the select starting point or the changed select starting point; and
   calculating, by at least one processor, a motion vector corresponding to a displacement between the current block and the matching block found by the searching,
   wherein the comparing of the predetermined threshold with the cost further comprises changing the select starting point if the cost is not less than the predetermined threshold and comparing the predetermined threshold with a corresponding cost based upon the changed select starting point, and
   further comprising:
   comparing a minimum cost among costs indicating differences between the current block and blocks of the reference image specified by at least one of a plurality of corresponding changed select starting points with the cost indicating the difference between the current block and the block of the reference image specified by the select starting point; and
   searching in the reference image for the matching block of the current block from additional blocks corresponding to the at least one of the plurality of corresponding changed select starting points having the minimum cost if the minimum cost is less than the cost indicating the difference between the current block and the block of the reference image specified by the select starting point.

5. The motion estimation method of claim 3, further comprising:
   comparing the predetermined threshold with a minimum cost indicating the difference between the current block and the block of the reference image specified by at least one of a plurality of corresponding changed select starting points; and
   selecting another changed select starting point, of the plurality of corresponding changed select starting points, in addition to the at least one of the plurality of corresponding changed select starting points if the minimum cost is greater than the predetermined threshold.

6. The motion estimation method of claim 1, further comprising determining the predetermined threshold so as to be a criterion for selecting a suitable starting point for searching in the reference image for the matching block of the current block.

7. The motion estimation method of claim 6, wherein the determining of the predetermined threshold comprises:
   calculating a peak signal to noise ratio (PSNR) between original images making up a test sequence and reconstructed images using a random threshold;
   comparing the calculated PSNR with a predetermined PSNR; and
   selectively determining the random threshold to be the predetermined threshold based on the comparing of the calculated PSNR with the predetermined PSNR.

8. A motion estimation method, comprising:
   comparing, by at least one processor, a predetermined threshold with a cost indicating a difference between a current block of a current image and a block of a reference image specified by a select starting point, wherein the select starting point is changed based upon the comparing of the predetermined threshold and the cost;
   selectively searching, by at least one processor, for a matching block of the current block from the select starting point or the changed select starting point; and
   calculating, by at least one processor, a motion vector corresponding to a displacement between the current block and the matching block found by the searching, and
   further comprising determining the predetermined threshold so as to be a criterion for selecting a suitable starting point for searching in the reference image for the matching block of the current block,
   wherein the determining of the predetermined threshold comprises:
   calculating a peak signal to noise ratio (PSNR) between original images making up a test sequence and reconstructed images using a random threshold;
   comparing the calculated PSNR with a predetermined PSNR; and
   selectively determining the random threshold to be the predetermined threshold based on the comparing of the calculated PSNR with the predetermined PSNR, wherein the determining of the predetermined threshold further comprises:
selecting the select starting point for searching in the reference image for the matching block of the current block of the current image from among the original images;
comparing the cost indicating the difference between the current block and a block of the reference image specified by the select starting point selected in the selecting of the select starting point with the random threshold;
selectively searching in the reference image corresponding to the original image for the matching block of the current block from the select starting point according to the comparing of the cost indicating the difference between the current block and the block of the reference image;
generating a prediction image for the current image from among the original images using a motion vector corresponding to a displacement between the current block of the current image and a block found in the selectively searching in the reference image; and
generating a reconstructed image of the current image from among the original images from the prediction image.

9. The motion estimation method of claim 6, wherein the determining of the predetermined threshold comprises determining the predetermined threshold using costs indicating differences between neighboring blocks of the current block and blocks of the reference image corresponding to the neighboring blocks.

10. A motion estimation method, comprising:
comparing, by at least one processor, a predetermined threshold with a cost indicating a difference between a current block of a current image and a block of a reference image specified by a select starting point, wherein the select starting point is changed based upon the comparing of the predetermined threshold and the cost;
selectively searching, by at least one processor, for a matching block of the current block from the select starting point or the changed select starting point; and
calculating, by at least one processor, a motion vector corresponding to a displacement between the current block and the matching block found by the searching, and
further comprising determining the predetermined threshold so as to be a criterion for selecting a suitable starting point for searching in the reference image for the matching block of the current block,
wherein the determining of the predetermined threshold comprises determining the predetermined threshold using costs indicating differences between neighboring blocks of the current block and blocks of the reference image corresponding to the neighboring blocks,
wherein the determining of the predetermined threshold comprises determining the predetermined threshold using a cost indicating a difference between a block located above the current block and a block of the reference image corresponding to the block located above the current block, a cost indicating a difference between a block located above and to the right side of the current block and a block of the reference image corresponding to the block located above and to the right side of the current block, and a cost indicating a difference between a block located to the left side of the current block and a block of the reference image corresponding to the block located to the left side of the current block.

11. At least one non-transitory medium comprising computer readable code to control at least one processing element to implement a motion estimation method, the motion estimation method comprising:

comparing a predetermined threshold with a cost indicating a difference between a current block of a current image and a block of a reference image specified by a select starting point, wherein the select starting point is changed based upon the comparing of the predetermined threshold and the cost; and
selectively searching for a matching block of the current block using a predetermined local search algorithm from the changed select starting point, according to the comparing; and
calculating a motion vector corresponding to a displacement between the current block and the matching block found by the searching.

12. A motion estimation system, comprising:
a comparison unit to compare a predetermined threshold with a cost indicating a difference between a current block of a current image and a block of a reference image specified by a select starting point, wherein the select starting point is changed based upon the comparing of the predetermined threshold and the cost;
a search unit to selectively search for a matching block of the current block using a predetermined local search algorithm from the changed select starting point, according to the comparing; and
a motion vector calculation unit to calculate a motion vector corresponding to a displacement between the current block and the matching block found by the search unit,
wherein at least one of the above units are performed by at least one processor.

13. A video encoding method, comprising:
calculating, by at least one processor, a motion vector using a threshold that is a criterion for determining a suitable start point for searching in a reference image for a matching block of a current block of a current image;
generating, by at least one processor, a prediction image of the current image from the reference image using the calculated motion vector;
calculating, by at least one processor, a difference between the generated prediction image and the current image to generate a difference between the current image and the generated prediction image; and
encoding and outputting, by at least one processor, the calculated difference between the current image and the generated prediction image,
wherein the suitable starting point is determined based upon the comparison of the threshold and a cost indicating a difference between the current block and a block of the reference image specified by a select starting point, and
further comprising selectively searching for a matching block of the current block using a predetermined local search algorithm from a start point other than the select starting point, according to the comparison.

14. The video encoding method of claim 13, wherein the calculating of the motion vector comprises comparing the threshold with the cost, wherein the select starting point is changed based upon the comparison of the threshold and the cost and selectively searching for the matching block of the current block from the select starting point or the changed select starting point.

15. The video encoding method of claim 13, wherein the encoding and outputting of the calculated difference comprises:
transforming the calculated difference between the current image and the generated prediction image from a color domain to a frequency domain;

quantizing values of the frequency domain transformed calculated difference; and performing entropy encoding on the quantized values.

16. At least one non-transitory medium comprising computer readable code to control at least one processing element to implement a video encoding method, the video encoding method comprising:

calculating a motion vector using a threshold that is a criterion for determining a suitable start point for searching in a reference image for a matching block of a current block of a current image;

generating a prediction image of the current image from the reference image using the calculated motion vector;

calculating a difference between the generated prediction image and the current image to generate a difference between the current image and the generated prediction image; and encoding and outputting the calculated difference between the current image and the generated prediction image, wherein the suitable starting point is determined based upon a comparison of the threshold and a cost indicating a difference between the current block and a block of the reference image specified by a select starting point, and further comprising selectively searching for a matching block of the current block using a predetermined local search algorithm from a start point other than the select starting point, according to the comparison.

17. A video encoder, comprising:

a motion estimation unit to calculate a motion vector using a threshold that is a criterion for determining a suitable start point for searching in a reference image for a matching block of a current block of a current image;

a motion compensation unit to generate a prediction image of the current image from the reference image using the calculated motion vector;

a subtraction unit to calculate a difference between the generated prediction image and the current image to generate a difference between the current image and the generated prediction image; and an encoding unit to encode and output the calculated difference between the current image and the generated prediction image, wherein the suitable starting point is determined based upon a comparison of the threshold and a cost indicating a difference between the current block and a block of the reference image specified by a select starting point, and further comprising a search unit to selectively search for a matching block of the current block using a predetermined local search algorithm from a start point other than the select starting point, according to the comparison, wherein at least one of the above units are performed by at least one processor.

* * * * *

UNITED STATES PATENT AND TRADEMARK OFFICE
CERTIFICATE OF CORRECTION

| | | |
|---|---|---|
| PATENT NO. | : 8,335,255 B2 | Page 1 of 1 |
| APPLICATION NO. | : 11/783599 | |
| DATED | : December 18, 2012 | |
| INVENTOR(S) | : Ho-jin Lee et al. | |

It is certified that error appears in the above-identified patent and that said Letters Patent is hereby corrected as shown below:

In the Claims:

Column 16; Line 47; In Claim 13, delete "upon the" and insert -- upon a --, therefor.

Signed and Sealed this
Fourteenth Day of May, 2013

Teresa Stanek Rea
*Acting Director of the United States Patent and Trademark Office*